United States Patent
Furukawa

(10) Patent No.: US 10,566,920 B2
(45) Date of Patent: Feb. 18, 2020

(54) CONTROL DEVICE FOR AC ROTARY MACHINE AND CONTROL DEVICE FOR ELECTRIC POWER STEERING

(71) Applicant: Mitsubishi Electric Corporation, Tokyo (JP)

(72) Inventor: Akira Furukawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 23 days.

(21) Appl. No.: 15/551,649

(22) PCT Filed: Mar. 12, 2015

(86) PCT No.: PCT/JP2015/057312
§ 371 (c)(1),
(2) Date: Aug. 17, 2017

(87) PCT Pub. No.: WO2016/143120
PCT Pub. Date: Sep. 15, 2019

(65) Prior Publication Data
US 2018/0034397 A1    Feb. 1, 2018

(51) Int. Cl.
*H02P 21/22*    (2016.01)
*H02P 6/06*    (2006.01)
(Continued)

(52) U.S. Cl.
CPC .............. *H02P 21/22* (2016.02); *B62D 5/046* (2013.01); *H02P 6/10* (2013.01); *H02P 27/12* (2013.01); *H02P 21/18* (2016.02); *H02P 2205/05* (2013.01)

(58) Field of Classification Search
CPC . H02P 6/06; H02P 21/14; H02P 21/22; B62D 5/046
See application file for complete search history.

(56) References Cited

U.S. PATENT DOCUMENTS

2011/0297475 A1* 12/2011 Taniguchi .............. B62D 5/046
                                                                180/446
2012/0176069 A1*  7/2012 Sagami ................ B62D 5/0487
                                                                318/400.02
(Continued)

FOREIGN PATENT DOCUMENTS

CN    103346723 A    10/2013
CN    103812421 A     5/2014
(Continued)

OTHER PUBLICATIONS

International Search Report for PCT/JP2015/057312, dated Jun. 2, 2015.
(Continued)

*Primary Examiner* — Bickey Dhakal
*Assistant Examiner* — Cortez M Cook
(74) *Attorney, Agent, or Firm* — Sughrue Mion, PLLC; Richard C. Turner

(57) ABSTRACT

A control device for an AC rotary machine includes an AC rotary machine having x-phase windings where x is at least three, an angle detector, a current detector, a voltage command calculator, and a power converter, wherein, when a current of at least one phase of the x phases is detectable and currents of at most (x−1) phases are undetectable at a present current detection timing, the current detector estimates the currents of the (x−1) phases that are undetectable at the present current detection timing by calculation on the basis of detected currents of x phases obtained at a past current detection timing, the detected current of the single phase that is detectable at the present current detection timing, and an angle variation amount from the past current detection timing to the present current detection timing.

12 Claims, 9 Drawing Sheets

(51) Int. Cl.
  *B62D 5/04* (2006.01)
  *H02P 6/10* (2006.01)
  *H02P 27/12* (2006.01)
  *H02P 21/18* (2016.01)

(56) References Cited

U.S. PATENT DOCUMENTS

| | | | |
|---|---|---|---|
| 2013/0234635 A1 | 9/2013 | Kojima | |
| 2013/0278186 A1* | 10/2013 | Suzuki | ............ H02P 21/14 318/400.02 |
| 2013/0278187 A1* | 10/2013 | Suzuki | ............ H02P 21/14 318/400.02 |
| 2014/0117893 A1 | 5/2014 | Omata et al. | |
| 2014/0225535 A1 | 8/2014 | Omata et al. | |
| 2014/0368142 A1* | 12/2014 | Uchida | ............ H02P 6/06 318/400.21 |

FOREIGN PATENT DOCUMENTS

| | | |
|---|---|---|
| EP | 2403130 A2 | 1/2012 |
| JP | 2004-159391 A | 6/2004 |
| JP | 2009-089552 A | 4/2009 |
| JP | 2013-225994 A | 10/2013 |
| JP | 5396948 B2 | 1/2014 |
| JP | 2014-155326 A | 8/2014 |
| JP | 2014-212602 A | 11/2014 |

OTHER PUBLICATIONS

Communication dated Nov. 9, 2018, from European Patent Office in counterpart application No. 15884610.5.
Communication dated May 27, 2019 from the State Intellectual Property Office of the P.R.C. in application No. 201580077614.2.

* cited by examiner

CONTROL DEVICE FOR AC ROTARY MACHINE AND CONTROL DEVICE FOR ELECTRIC POWER STEERING

CROSS REFERENCE TO RELATED APPLICATIONS

This application is a National Stage of International Application No. PCT/JP2015/057312 filed Mar. 12, 2015, the contents of all of which are incorporated herein by reference in their entirety.

TECHNICAL FIELD

This invention relates to a control device for an AC rotary machine and a control device for an electric power steering with which a current detection error and a torque ripple caused thereby can be reduced.

BACKGROUND ART

In a conventional motor control device, a duty of a current undetectable phase is fixed at 100% to prevent switching noise generated in a maximum phase where current detection is impossible from hindering current detection performed in relation to two phases other than the undetectable phase. Further, in this conventional motor control device, the phase current value of the undetectable phase is estimated on the basis of the phase current detection values of the two phases other than the undetectable phase (see PTL 1, for example).

CITATION LIST

Patent Literature

[PTL 1] Japanese Patent Publication No. 5396948

SUMMARY OF INVENTION

Technical Problem

However, the prior art has the following problem.

In the motor control device according to PTL 1, in a case where an ON time of a low potential side switching element of the maximum phase is set to be smaller than a phase current detection time is in order to secure the phase current detection time ts, switching noise is prevented from becoming intermixed in the phase current values of the two phases other than the maximum phase by keeping a high potential side switching element ON and keeping the low potential side switching element OFF.

According to FIG. 4 of PTL 1, to secure the phase current detection time ts, phase current detection must be implemented ts/2 before the center of a single carrier period. For example, when Dth is set at 90% and a modulation factor is approximately 100%, noise can be prevented from becoming intermixed by employing the configuration of PTL 1.

However, when the modulation factor increases, the duty of an intermediate phase exceeds Dth. At a current detection timing, therefore, the low potential side switching element of only the minimum phase is ON, and therefore only one phase is detectable. In this case, the method of PTL 1, in which the remaining phase is estimated from the two detectable phases, cannot be applied.

This invention has been designed to solve the problem described above, and an object thereof is to obtain a control device for an AC rotary machine and a control device for an electric power steering with which a current detection error and a torque ripple caused thereby can be reduced even when only one phase is detectable.

Solution to Problem

A control device for an AC rotary machine according to this invention includes: an AC rotary machine having x-phase windings where x is at least three; an angle detector for detecting an angle of the AC rotary machine; a current detector for detecting currents of the respective phases of the x-phase windings; a voltage command calculator that calculates x-phase voltage commands by implementing feedback control on the respective phases so that respective deviations between a current command and the currents detected by the current detector are reduced to zero; and a power converter that applies a voltage to the x-phase windings on the basis of the x-phase voltage commands, wherein, when a current of at least one phase of the x phases is detectable and currents of at most (x−1) phases are undetectable at a present current detection timing, the current detector estimates the currents of the (x−1) phases that are undetectable at the present current detection timing by calculation on the basis of detected currents of x phases obtained at a past current detection timing, the detected current of the single phase that is detectable at the present current detection timing, and an angle variation amount, which is a difference between the angle of the AC rotary machine detected by the angle detector at the past current detection timing and the angle of the AC rotary machine at the present current detection timing.

Advantageous Effects of Invention

According to this invention, when the currents of (x−1) phases among the x phases are undetectable, the currents of the undetectable (x−1) phases are calculated on the basis of the detected current of the single detectable phase obtained in the present, the detected currents of x phases obtained in the past, and an angle variation amount $\Delta\theta$ from the past to the present, whereby highly precise estimated values can be obtained. As a result, it is possible to obtain a control device for an AC rotary machine and a control device for an electric power steering with which a current detection error and a torque ripple caused thereby can be reduced even when only one phase is detectable.

DESCRIPTION OF EMBODIMENTS

Figure 1:
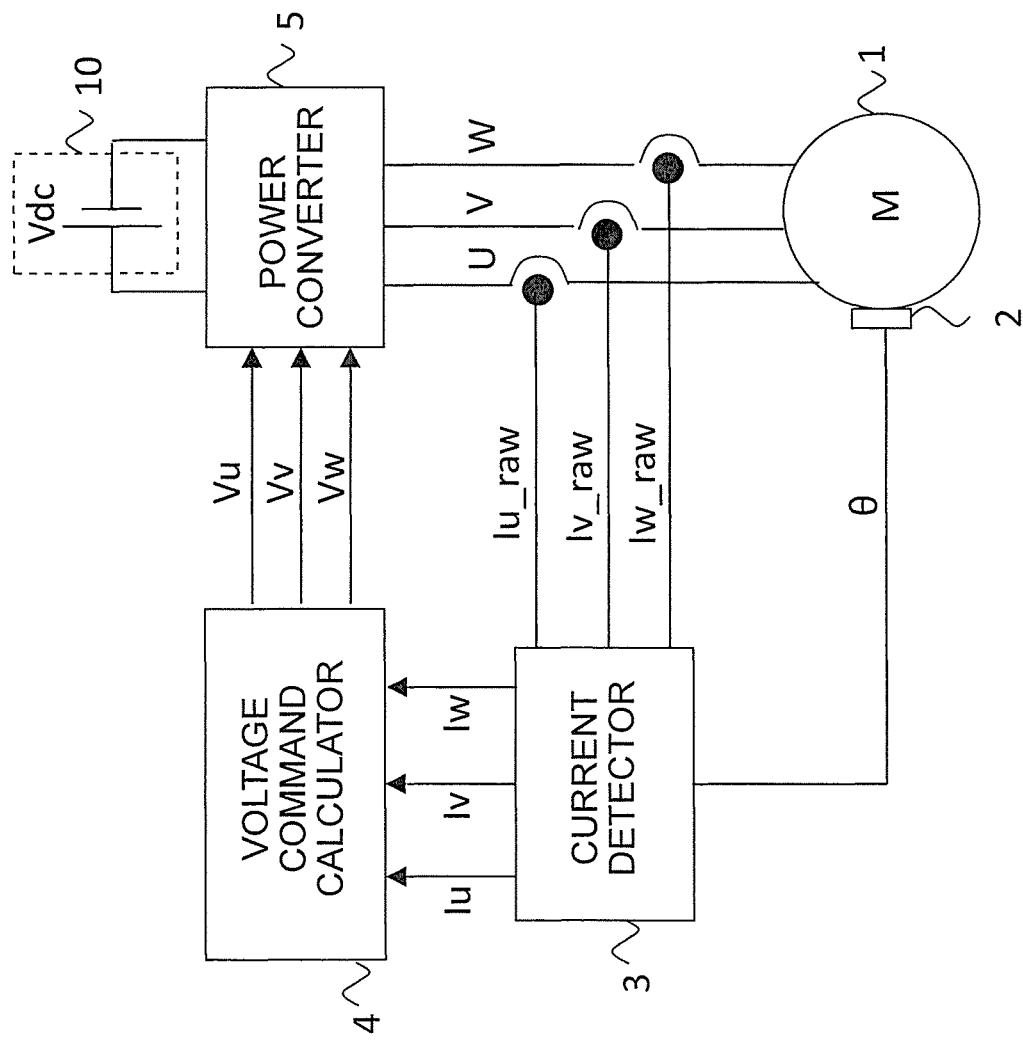
FIG. 1 is a view showing an overall configuration of a control device for an AC rotary machine according to a first embodiment of this invention.

Preferred embodiments of a control device for an AC rotary machine and a control device for an electric power steering according to this invention will be described below using the drawings. Note that identical or corresponding members and sites in the drawings will be described using identical reference numerals.

First Embodiment

FIG. 1 is a view showing an overall configuration of a control device for an AC rotary machine according to a first embodiment of this invention. In FIG. 1, an AC rotary machine 1 is a permanent magnet type synchronous rotary machine having windings U, V, W of three phases. Note that in the first embodiment, a case in which a permanent magnet type synchronous rotary machine is used as the AC rotary machine 1 will be described, but the AC rotary machine 1 may also be a field winding type synchronous rotary machine.

A DC power supply 10 outputs a DC voltage Vdc to a power converter 5, to be described below. Any device that outputs a DC voltage, such as a battery, a DC-DC converter, a diode rectifier, or a PWM rectifier, may be used as the DC power supply 10.

An angle detector 2 is a position detector such as a Hall element, a resolver, or an encoder, and detects a rotation position θ of the AC rotary machine 1. Alternatively, a technique of estimating the angle on the basis of detected currents detected by a current detector 3, to be described below, or the like may be employed instead of the angle detector 2.

The current detector 3 calculates detected currents Iu, Iv, Iw from currents Iu_raw, Iv_raw, Iw_raw detected using a current detector such as a shunt resistor or a Hall element.

A voltage command calculator 4 calculates voltage commands Vu, Vv, Vw for driving the AC rotary machine 1, and outputs the calculated voltage commands Vu, Vv, Vw to the power converter 5. As a method for calculating the voltage commands Vu, Vv, Vw, the voltage command calculator 4 may employ current feedback control or the like in which a current command for the AC rotary machine 1 is set as a control command, whereupon the voltage commands Vu, Vv, Vw are calculated by proportional integral control so as to reduce respective deviations between the control command and the detected currents Iu, Iv, Iw output by the current detector 3 to zero.

The power converter 5 generates switching signals Qup to Qwn having pulse widths corresponding to the voltage commands Vu, Vv, Vw output from the voltage command calculator 4 by executing pulse width modulation (PWM) on the basis of the voltage commands Vu, Vv, Vw.

Further, by switching semiconductor switches Sup to Swn ON and OFF on the basis of the generated switching signals Qup to Qwn, the power converter 5 power-converts the DC voltage Vdc input from the DC power supply 10 and applies the resulting voltage to the three-phase windings U, V, W of the AC rotary machine 1. Note that each of the switches Sup to Swn is constituted by a semiconductor switch such as an IGBT, a bipolar transistor, or a MOS power transistor, and a diode connected in anti-parallel to the semiconductor switch.

Here, the switching signals Qup to Qwn respectively denote the following signals.

Switching signal Qup: ON/OFF signal for U phase high potential side switching element Sup Switching signal Qun: ON/OFF signal for U phase low potential side switching element Sun Switching signal Qvp: ON/OFF signal for V phase high potential side switching element Svp Switching signal Qvn: ON/OFF signal for V phase low potential side switching element Svn Switching signal Qwp: ON/OFF signal for W phase high potential side switching element Swp Switching signal Qwn: ON/OFF signal for W phase low potential side switching element Swn The voltage that is supplied to the power converter 5 is determined in accordance with the DC voltage Vdc. Therefore, when implementing PWM, the power converter 5 employs various well-known modulation methods in order to improve the voltage use rate.

Figure 2:
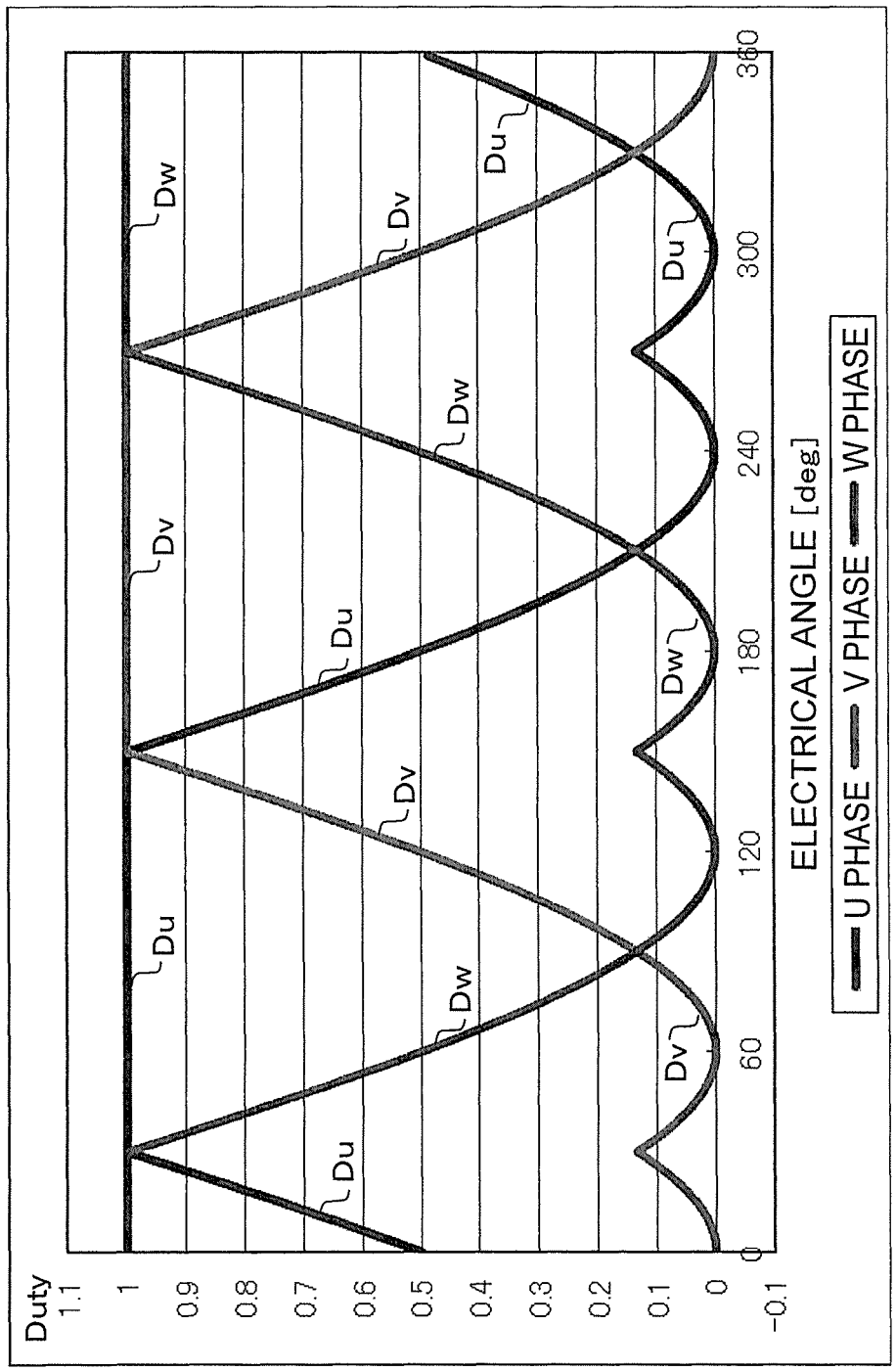
FIG. 2 is a view showing a specific example of a modulation method according to the first embodiment of this invention.

FIG. 2 is a view showing a specific example of a modulation method according to the first embodiment of this invention. A case in which modulation is implemented as shown in FIG. 2, for example, will be considered. In FIG. 2, the abscissa shows the electrical angle [deg] and the ordinate shows a ratio relative to the DC voltage Vdc (referred to hereafter as the duty). Du, Dv, and Dw respectively denote a U phase duty, a V phase duty, and a W phase duty.

When a shunt resistor is provided on the low potential side switching element side, the current required to energize the shunt resistor can be reduced by setting the maximum phase to remain at 100% constantly over a single period of the electrical angle. However, a timing at which the maximum phase and the intermediate phase are at 100% simultaneously arrives three times over a single period of the electrical angle. At these timings, therefore, current detection can be implemented in relation to only one of the three phases.

Here, the timings at which only one phase can be detected in the modulation method shown in FIG. 2 were described, but needless to mention, a similar concept can be applied to a case in which a current detection error is small in only one of the three phases.

Currents Iu0, Iv0, Iw0 of three phases obtained when the electrical angle is θ0 are given by Equation (1), shown below.

$$\begin{cases} I_{u0} = I_0 \sin(\theta_0 + \alpha) \\ I_{v0} = I_0 \sin\left(\theta_0 + \alpha - \frac{2}{3}\pi\right) \\ I_{w0} = I_0 \sin\left(\theta_0 + \alpha + \frac{2}{3}\pi\right) \end{cases} \quad (1)$$

Currents Iu1, Iv1, Iw1 of three phases obtained when the electrical angle varies by Δθ therefrom are given by Equation (2), shown below.

$$\begin{cases} I_{u1} = I_1 \sin(\theta_0 + \Delta\theta + \alpha) \\ I_{v1} = I_1 \sin\left(\theta_0 + \Delta\theta + \alpha - \frac{2}{3}\pi\right) \\ I_{w1} = I_1 \sin\left(\theta_0 + \Delta\theta + \alpha + \frac{2}{3}\pi\right) \end{cases} \quad (2)$$

Here, a case in which the detected currents Iu0, Iv0, Iw0 of the three phases shown in Equation (1) are obtained when the electrical angle is θ0 but the detected current Iu1 of only one phase, among the detected currents of the three phases shown in Equation (2), is obtained when the electrical angle varies by Δθ therefrom will be described as an example. Equation (1) can be transformed into Equation (3), shown below.

$$\begin{cases} I_0 \sin(\theta_0 + \alpha) = I_{u0} \\ I_0 \cos(\theta_0 + \alpha) = \dfrac{I_{w0} - I_{v0}}{\sqrt{3}} \end{cases} \quad (3)$$

Further, Equation (2) can be transformed into Equation (4), shown below.

$$\begin{cases} I_{v1} + I_{w1} = -I_{u1} \\ I_{w1} - I_{v1} = \sqrt{3}\, I_1 \cos(\theta_0 + \Delta\theta + \alpha) \end{cases} \quad (4)$$

By applying an approximation such as that of Equation (5), shown below, which is often used in investigations relating to very small variation amounts, Equation (6), shown below, is obtained from Equation (4).

$$\begin{cases} \sin\Delta\theta \approx \Delta\theta \\ \cos\Delta\theta \approx 1 \end{cases} \quad (5)$$

$$\begin{cases} I_{v1} + I_{w1} = -I_{u1} \\ I_{w1} - I_{v1} = \sqrt{3}\, I_1 \{\cos(\theta_0 + \alpha) - \Delta\theta \sin(\theta_0 + \alpha)\} \end{cases} \quad (6)$$

Furthermore, when a difference between I0 and I1 is very small relative to I0, Equation (6) can be approximated by Equation (7), shown below.

$$\begin{cases} I_{v1} + I_{w1} = -I_{u1} \\ I_{w1} - I_{v1} = \sqrt{3}\, I_0 \{\cos(\theta_0 + \alpha) - \Delta\theta \sin(\theta_0 + \alpha)\} \end{cases} \quad (7)$$

When the above approximation is established, Equation (8), shown below, can be obtained from Equation (3) and Equation (7). More specifically, the currents Iv1, Iw1 of the two phases that cannot be detected when the electrical angle varies by Δθ can be calculated from Equation (8) using three-phase detected currents Iu0, Iv0, Iw0 obtained in the past at the electrical angle θ0 and the current Iu1 of the single phase that can be detected when the electrical angle varies by Δθ.

$$\begin{cases} I_{v1} = \dfrac{-I_{u1} + \sqrt{3}\,\Delta\theta I_{u0} + I_{v0} - I_{w0}}{2} \\ I_{w1} = \dfrac{-I_{u1} - \sqrt{3}\,\Delta\theta I_{u0} - I_{v0} + I_{w0}}{2} \end{cases} \quad (8)$$

Here, a case in which Iu1 is obtained as the current of the single phase that can be detected when the electrical angle varies by Δθ was described, but a case in which Iv1 or Iw1 is obtained is similar. Therefore, by implementing generalization using a, b, c, where (a, b, c)=(u, v, w) or (a, b, c)=(v, w, u) or (a, b, c)=(w, u, v), Equation (8) can be expressed as Equation (9), shown below. Note that in Equation (9), an affix old is appended to the respective detected currents obtained in the past at the electrical angle θ0.

$$\begin{cases} I_b = \dfrac{-I_a + \sqrt{3}\,\Delta\theta I_{a\_old} + I_{b\_old} - I_{c\_old}}{2} \\ I_c = \dfrac{-I_a - \sqrt{3}\,\Delta\theta I_{a\_old} - I_{b\_old} + I_{c\_old}}{2} \end{cases} \quad (9)$$

Next, effects obtained when the currents of the two undetectable phases are calculated using Equation (9) will be described. When the AC rotary machine 1 is assumed to be a surface permanent magnet motor (an SPM), the output torque thereof is given by Equation (10), shown below.

$$T = K_t I_q \quad (10)$$

In Equation (10), T denotes the output torque, Kt denotes a torque constant, and Iq denotes a q axis current. Note that here, for simplicity, a case in which the AC rotary machine 1 is a surface permanent magnet motor will be described, but similar effects can be obtained likewise when the AC rotary machine 1 is an inset type motor, an embedded magnet type motor, and so on. Moreover, needless to mention, the current of one of the three phases may be calculated using the fact that the sum of the currents of the three phases is zero.

In FIG. 2, the single phase detection timing occurs in three locations, namely 30 deg, 150 deg, and 270 deg. The current of the single detectable phase is Iv at 30 deg, Iw at 150 deg, and Iu at 270 deg. At electrical angles other than these three locations, meanwhile, the currents of the two phases other than the maximum phase can be detected.

Figure 3:
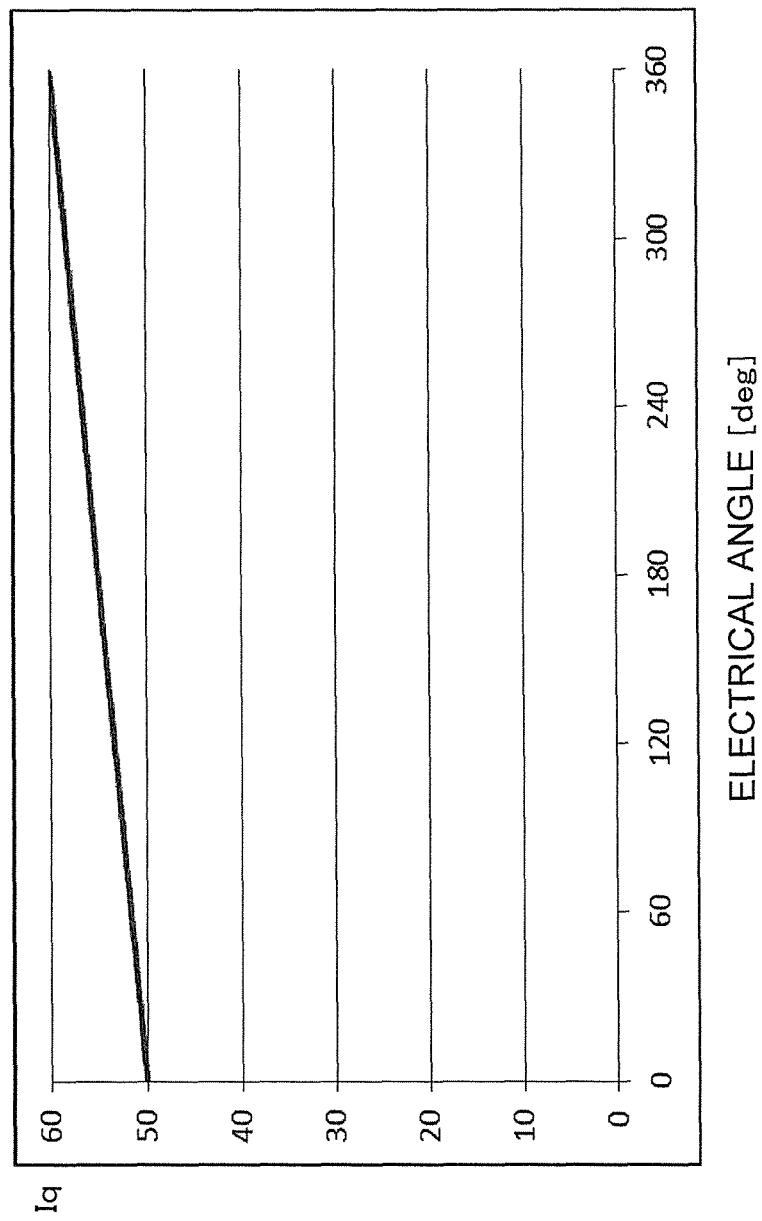
FIG. 3 is a view showing an example of variation in Iq over a single electrical angle period, according to the first embodiment of this invention.

FIG. 3 is a view showing an example of variation in Iq relative to a single electrical angle period, according to the first embodiment of this invention. In a case where Iq increases monotonically over a single electrical angle period, as shown in FIG. 3, current detection is assumed to be implemented every time Iq varies by 1 deg.

An angle formed by a voltage vector and a current vector on a dq axis varies due to inductance, magnetic flux, the rotation speed, and so on. To simplify the description, it is assumed here that phase angles of the voltage vector and the current vector are equal.

Figure 4:
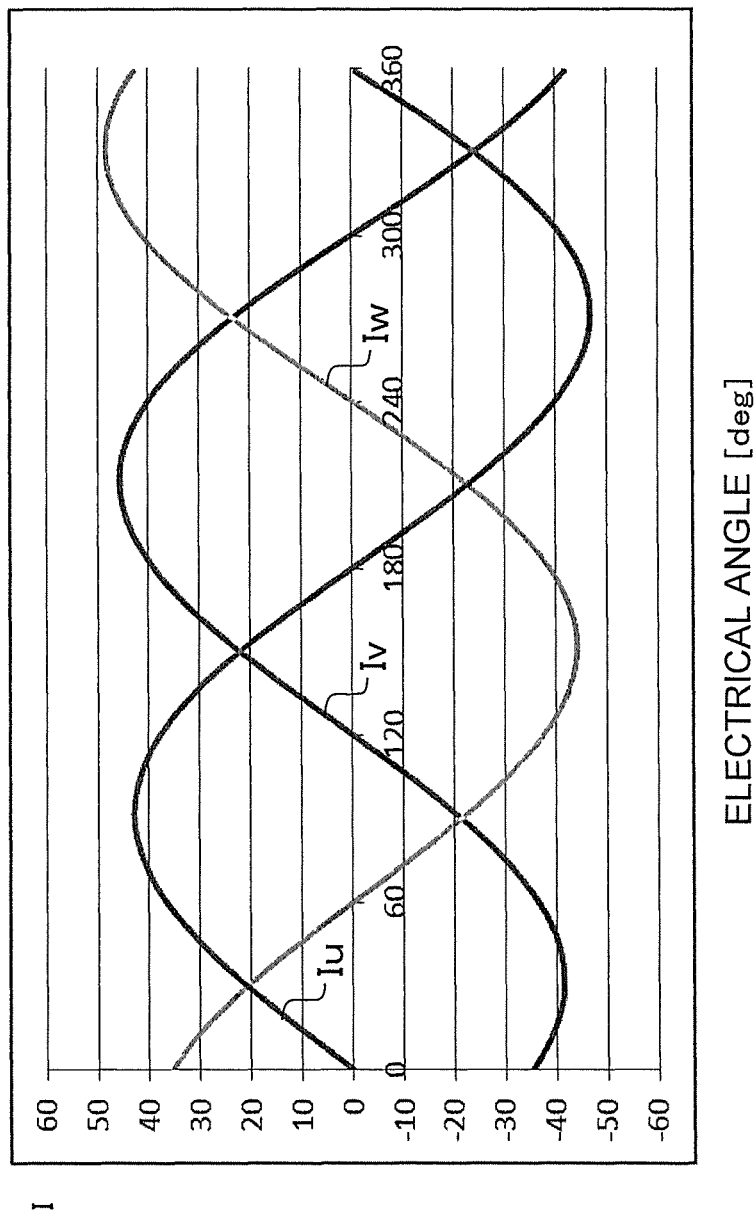
FIG. 4 is a view showing variation in currents of three phases over a single electrical angle period, according to the first embodiment of this invention.

FIG. 4 is a view showing variation in the currents of the three phases over a single electrical angle period, according to the first embodiment of this invention. When the phase angles of the voltage vector and the current vector are equal, the currents Iu, Iv, Iw of the three phases vary as shown in FIG. 4.

Figure 5:
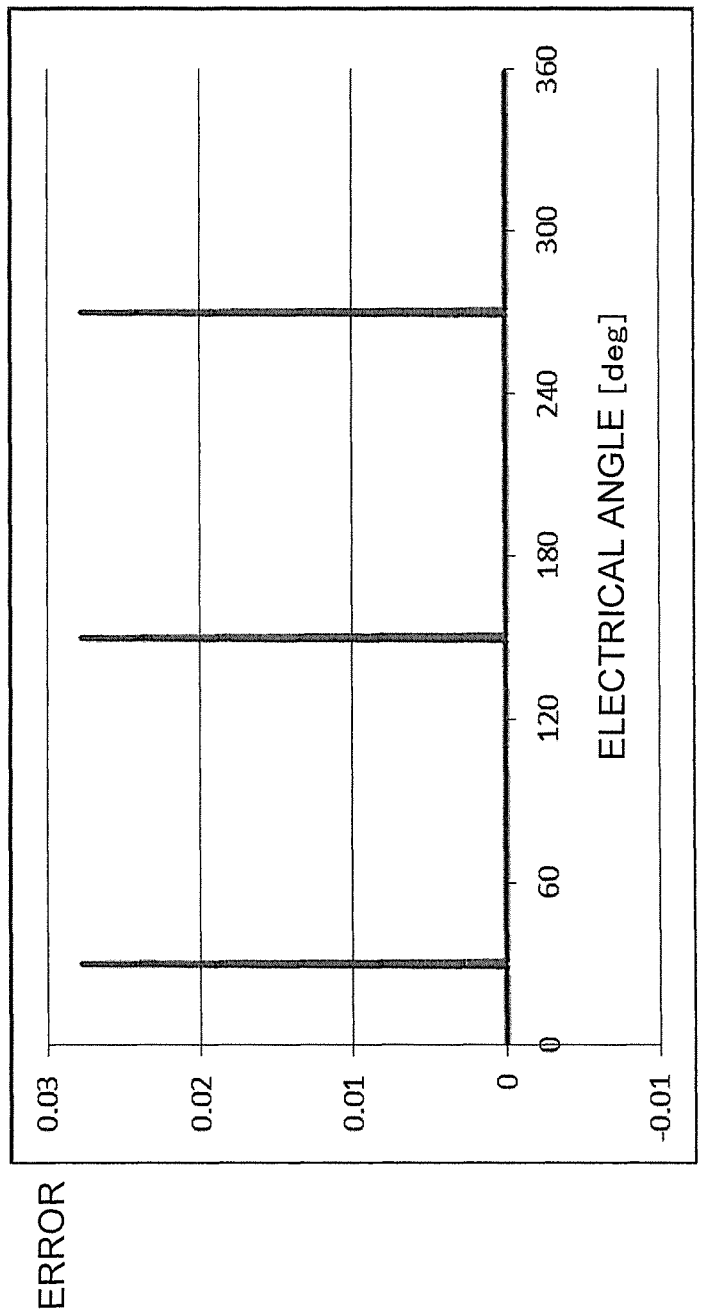
FIG. 5 is an illustrative view relating to an error occurring in a current detection value at a single phase detection timing that arrives three times over a single electrical angle period, according to the first embodiment of this invention.

FIG. 5 is an illustrative view relating to an error occurring in the current detection value at the single phase detection timing that arrives three times over a single electrical angle period, according to the first embodiment of this invention.

As shown in FIG. 5, when Iq obtained from previously detected three-phase currents is used as is instead of using the current of the single detectable phase at the single phase detection timing that arrives three times over a single electrical angle period, an error occurs in Iq in accordance with the temporal variation in Iq.

At this point, only the detection values deviate, but the voltage command calculator 4 implements control using Iq including the error, and as a result, the voltage commands deviate such that an actual value of Iq deviates from an expected value. Here, as shown in Equation (10), the output torque is commensurate with Iq, and therefore the error in Iq appears as an electrical angle third order torque ripple.

Figure 6:
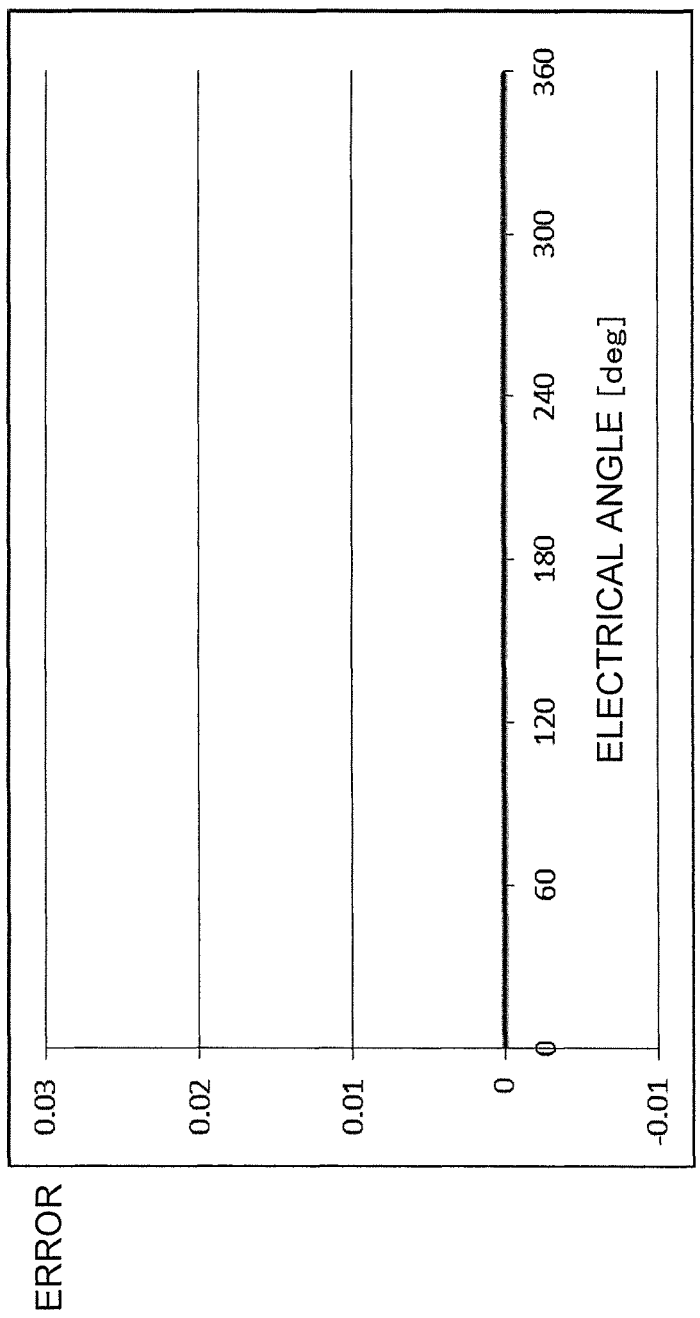
FIG. 6 is an illustrative view showing a case in which the error occurring in the current detection value at the single phase detection timing that arrives three times over a single electrical angle period is reduced by implementing calculation processing according to the first embodiment of this invention.

FIG. 6, meanwhile, is an illustrative view showing a case in which the error occurring in the current detection value at the single phase detection timing that arrives three times over a single electrical angle period is reduced by implementing calculation processing according to the first embodiment of this invention. When the currents of the two undetectable phases are determined by calculation at the single phase detection timing that arrives three times over a single electrical angle period using the current of the single phase that can be detected in the present, the three-phase currents obtained in the past, and the angle variation amount $\Delta\theta$ from the past to the present, as shown in Equation (9), the error occurring in Iq decreases substantially to zero, as shown in FIG. 6.

As a result, the electrical angle third order torque ripple shown in FIG. 5, which occurs when calculation processing using the single detectable phase is not implemented, can be greatly reduced, as shown in FIG. 6.

Hence, according to the first embodiment, when a current Ia of one phase is detectable but currents Ib, Ic of the two remaining phases of the three phases are undetectable, the currents Ib, Ic of the two undetectable phases can be estimated by calculation on the basis of the detected current Ia of the single detectable phase obtained in the present, three-phase detected currents Ia_old, Ib_old, Ic_old obtained in the past, and the angle variation amount $\Delta\theta$ from the past to the present.

As a result, a superior effect not present in the prior art can be obtained, namely that a current detection error occurring when past detectable values of Ib_old, Ic_old are used as is as current values instead of estimating Ib and Ic by calculation using the detected current Ia of the single detectable phase, and a torque ripple caused by the current detection error, can be greatly reduced, enabling a reduction in a region where open loop control is performed.

Note that in the specific example described above, a case in which currents obtained 1 deg previously, for example, are used as the three-phase detected currents obtained in the past was described as an example of a case in which two phase detection is performed before and after single phase detection. However, when a single phase detection condition remains established continuously, an estimation error in the detected currents of the two undetectable phases accumulates.

In this case, a superior effect not present in the prior art can likewise be obtained, namely that accumulation of an estimation error in the detected currents of the two undetectable phases is suppressed by employing current values obtained when at least two phases were detectable as the three-phase detected currents obtained in the past.

Furthermore, the control device for an AC rotary machine according to the first embodiment can be applied to an electric power steering that uses an AC rotary machine to generate torque for assisting steering torque generated by a steering system. As a result of this application, it is possible to realize a control device for an electric power steering with which a torque ripple and noise generated by the steering system can be reduced.

Second Embodiment

In the first embodiment, Equation (5) is used in the estimation calculation as an approximation of a trigonometric function relating to a very small angle variation amount. In a high rotation region where angle variation is large, however, $\Delta\theta$ increases, leading to an increase in an approximation error.

Hence, by applying Equation (11), in which consideration is extended to a second term by implementing a Taylor expansion, as a COS approximation, the error can be suppressed even during high rotation.

$$\begin{cases} \sin\Delta\theta \approx \Delta\theta \\ \cos\Delta\theta \approx 1 - \dfrac{\Delta\theta^2}{2} \end{cases} \quad (11)$$

Figure 7:
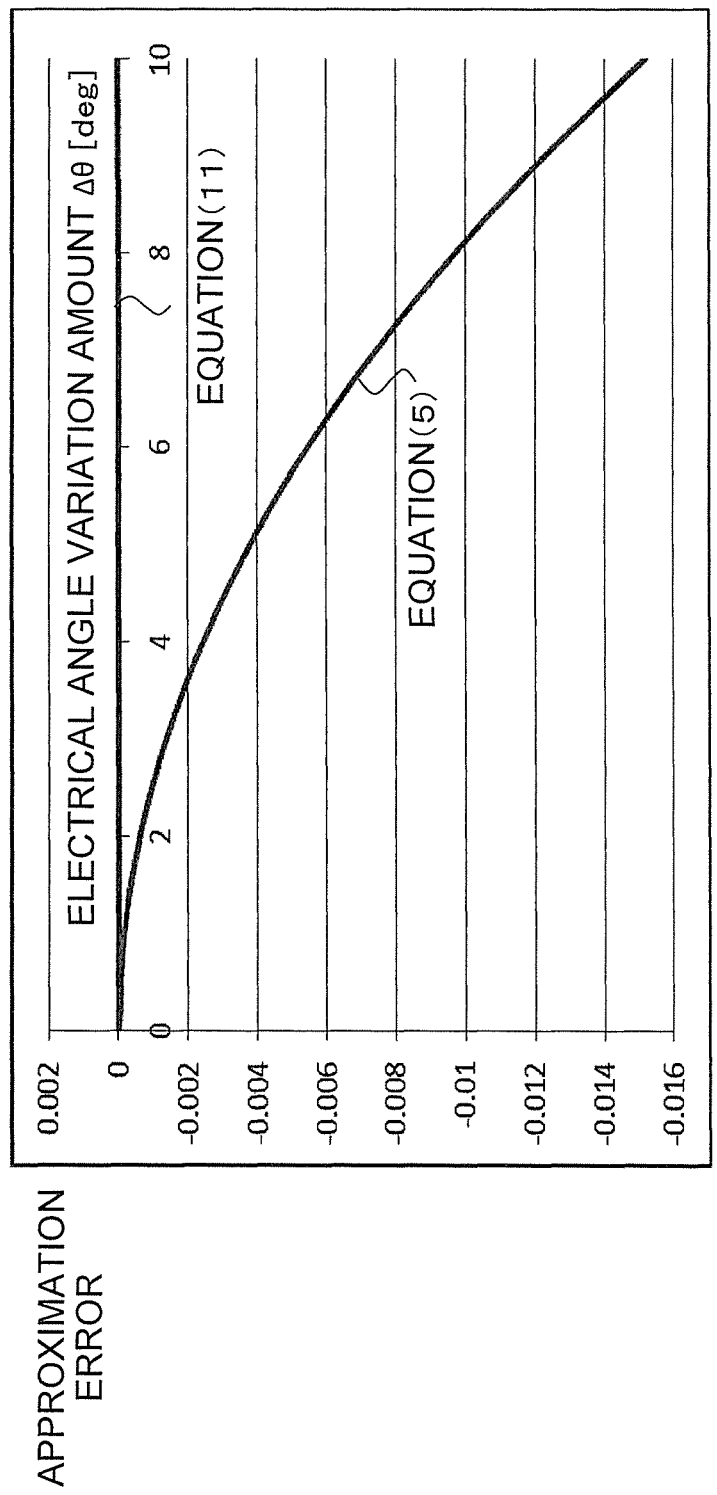
FIG. 7 is a view comparing variation occurring in an approximation error relative to an angle variation amount $\Delta\theta$ when Equations (5) and (11) are used, according to a second embodiment of this invention.

FIG. 7 is a view comparing the variation occurring in the approximation error relative to the angle variation amount $\Delta\theta$ when Equations (5) and (11) are used, according to the second embodiment of this invention. In FIG. 7, the abscissa shows $\Delta\theta$ [deg] and the ordinate shows the approximation error. It can be seen that when Equation (5) is applied to a 10 deg variation, an approximation error of 1.5% is included, but when the approximation of Equation (11) is used, the approximation error is greatly reduced.

Likewise when Equation (11) is applied, similarly to the first embodiment, by implementing generalization using a, b, c, where (a, b, c)=(u, v, w) or (a, b, c)=(v, w, u) or (a, b, c)=(w, u, v), Equation (11) can be expressed as Equation (12), shown below.

$$\begin{cases} I_b = \dfrac{-I_a + \sqrt{3}\,\Delta\theta I_{a\_old} + \left(1 - \dfrac{\Delta\theta^2}{2}\right)(I_{b\_old} - I_{c\_old})}{2} \\ I_c = \dfrac{-I_a - \sqrt{3}\,\Delta\theta I_{a\_old} - \left(1 - \dfrac{\Delta\theta^2}{2}\right)(I_{b\_old} - I_{c\_old})}{2} \end{cases} \quad (12)$$

Note that when even greater precision is required, an even higher order approximation, such as an approximation in which SIN is also taken into consideration up to the second term, may be used.

$$\begin{cases} \sin\Delta\theta \approx \Delta\theta - \dfrac{\Delta\theta^3}{6} \\ \cos\Delta\theta \approx 1 - \dfrac{\Delta\theta^2}{2} \end{cases} \quad (13)$$

Figure 8:
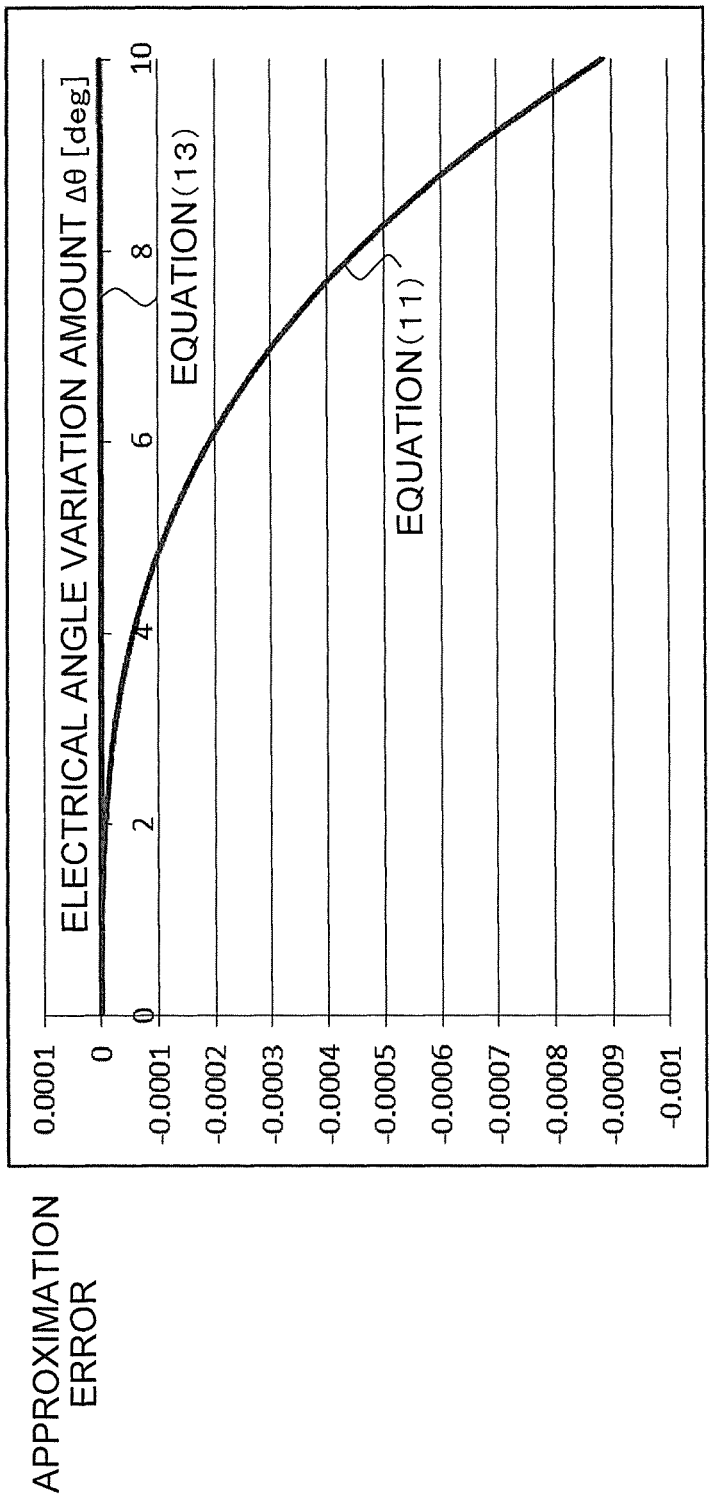
FIG. 8 is a view comparing variation occurring in the approximation error relative to the angle variation amount $\Delta\theta$ when Equations (11) and (13) are used, according to the second embodiment of this invention.

FIG. 8 is a view comparing the variation occurring in the approximation error relative to the angle variation amount $\Delta\theta$ when Equations (11) and (13) are used, according to the second embodiment of this invention. In FIG. 8, the abscissa shows $\Delta\theta$ [deg] and the ordinate shows the approximation error.

Note that although the approximation error can be reduced further by increasing the order, a processing load required to determine the detected currents by estimation calculation increases as a result. It may therefore be said that with the forms up to Equation (12), in which the approximation error reduction rate is large, balance is achieved between the effects and trade-offs.

Hence, according to the second embodiment, when the current Ia of one phase is detectable but the currents Ib, Ic of the two remaining phases of the three phases are undetectable, the currents Ib, Ic of the two undetectable phases can be calculated from Equation (12) on the basis of the detected current Ia of the single detectable phase obtained in the present, the three-phase detected currents Ia_old, Ib_old, Ic_old obtained in the past, and the angle variation amount $\Delta\theta$ from the past to the present.

As a result, a superior effect not present in the prior art can be obtained, namely that a current detection error occurring when past detectable values of Ib_old, Ic_old are used as is as current values instead of estimating Ib and Ic by calculation using the detected current Ia of the single detectable phase, and a torque ripple caused by the current detection error, can be greatly reduced even in a high rotation region, enabling a reduction in a region where open loop control is performed.

Third Embodiment

In the first and second embodiments, a control device for an AC rotary machine having three-phase windings was described. In a third embodiment, on the other hand, a specific method for applying the estimation calculation processing according to this invention to an AC rotary machine having x-phase windings (where x is a natural number no smaller than 3), which is obtained by generalizing the application subject AC rotary machine, will be described.

Figure 9:
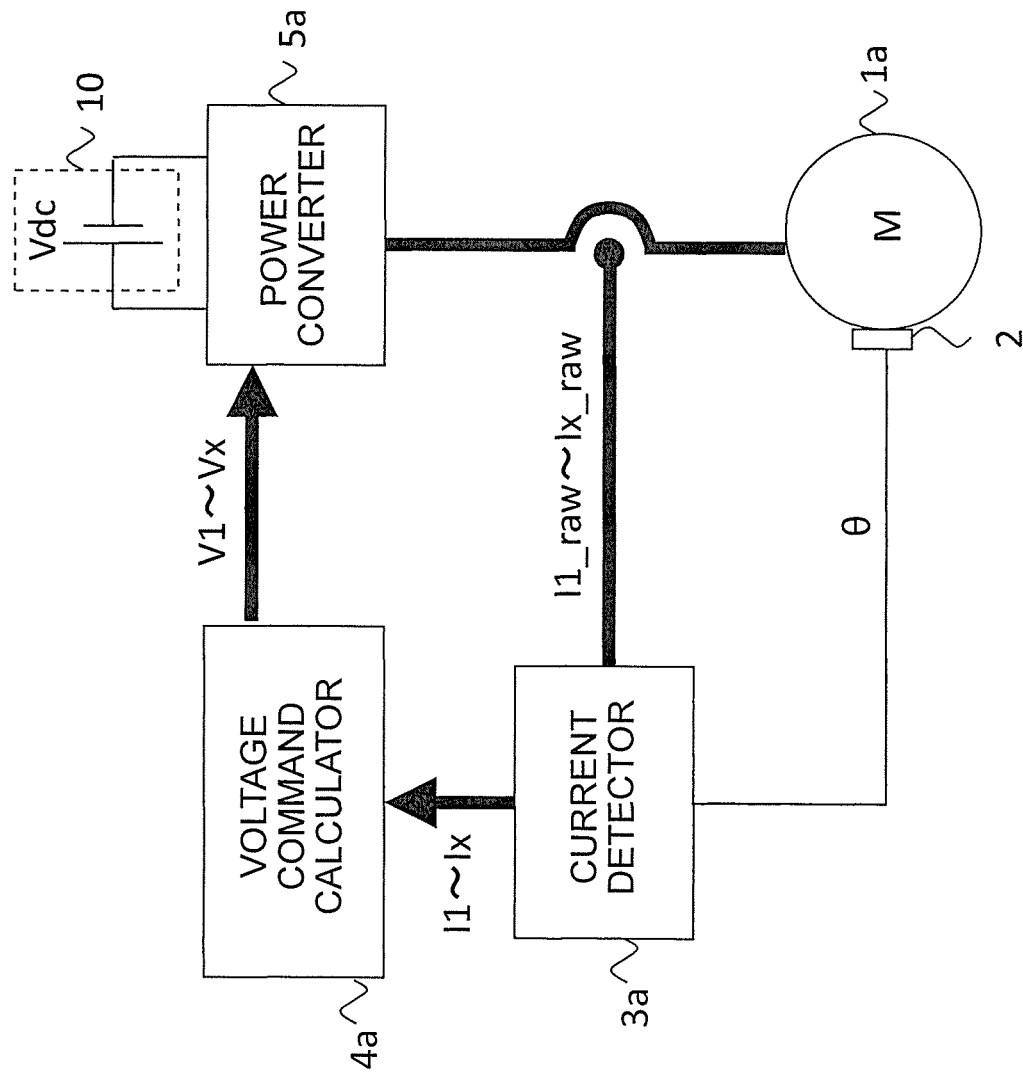
FIG. 9 is a view showing an overall configuration of a control device for an AC rotary machine according to a third embodiment of this invention.

FIG. 9 is a view showing an overall configuration of a control device for the AC rotary machine according to the third embodiment of this invention. In FIG. 9, an AC rotary machine 1a is a permanent magnet type synchronous rotary machine having windings of x phases. Note that in the third embodiment, a case in which a permanent magnet type synchronous rotary machine is used as the AC rotary machine 1a will be described, but the AC rotary machine 1a may also be a field winding type synchronous rotary machine.

The DC power supply 10 outputs the DC voltage Vdc to a power converter 5a, to be described below. Any device that outputs a DC voltage, such as a battery, a DC-DC converter, a diode rectifier, or a PWM rectifier, may be used as the DC power supply 10.

The angle detector 2 is a position detector such as a Hall element, a resolver, or an encoder, and detects the rotation position $\theta$ of the AC rotary machine 1a. Alternatively, a technique of estimating the angle on the basis of detected currents detected by a current detector 3a, to be described below, or the like may be employed instead of the angle detector 2.

The current detector 3a calculates detected currents I1, I2, . . . , Ix from currents I1_raw, I2_raw, . . . , Ix_raw detected using a current detector such as a shunt resistor or a Hall element.

A voltage command calculator 4a calculates voltage commands V1, V2, . . . , Vx for driving the AC rotary machine 1a, and outputs the calculated voltage commands V1, V2, . . . , Vx to the power converter 5a. As a method for calculating the voltage commands V1, V2, . . . , Vx, the voltage command calculator 4a may employ current feedback control or the like, in which a current command for the AC rotary machine 1a is set as a control command, whereupon the voltage commands V1, V2, . . . , Vx are calculated by proportional integral control so as to reduce respective deviations between the control command and the detected currents I1, I2, . . . , Ix output by the current detector 3a to zero.

The power converter 5a generates switching signals Q1p to Qxn having pulse widths corresponding to the voltage commands V1, V2, . . . , Vx output from the voltage command calculator 4a by executing pulse width modulation (PWM) on the basis of the voltage commands V1, V2, . . . , Vx.

Further, by switching semiconductor switches S1p to Sxn ON and OFF on the basis of the generated switching signals Q1p to Qxn, the power converter 5a power-converts the DC voltage Vdc input from the DC power supply 10 and applies the resulting voltage to the x-phase windings of the AC rotary machine 1a. Note that each of the switches S1p to Sxn is constituted by a semiconductor switch such as an IGBT, a bipolar transistor, or a MOS power transistor, and a diode connected in anti-parallel to the semiconductor switch.

Here, the switching signals Q1p to Qxn respectively denote the following signals.

Switching signal Q1p: ON/OFF signal for first phase high potential side switching element S1p Switching signal Q1n: ON/OFF signal for first phase low potential side switching element S1n Switching signal Q2p: ON/OFF signal for second phase high potential side switching element S2p Switching signal Q2n: ON/OFF signal for second phase low potential side switching element S2n Switching signal Qxp: ON/OFF signal for x phase high potential side switching element Sxp Switching signal Qxn: ON/OFF signal for x phase low potential side switching element Sxn When the electrical angle is set at $\theta$, x-phase currents I1, I2, . . . , Ix are given by Equation (14), shown below. A case in which x is an odd number expressed by 2k+1 will be described below.

$$\begin{cases} i_1 = I\sin\theta \\ i_2 = I\sin\left(\theta - \frac{2}{2k+1}\pi\right) \\ \vdots \\ i_{k+1} = I\sin\left(\theta - \frac{2k}{2k+1}\pi\right) \\ \vdots \\ i_{2k+1} = I\sin\left(\theta + \frac{2}{2k+1}\pi\right) \end{cases} \quad (14)$$

Further, x-phase currents I1', I2', . . . , Ix' obtained when the angle advances by $\Delta\theta$ from the condition of Equation (14) are given by Equation (15), shown below.

$$\begin{cases} i'_1 = I\sin(\theta + \Delta\theta) \\ i'_2 = I\sin\left(\theta + \Delta\theta - \dfrac{2}{2k+1}\pi\right) \\ \vdots \\ i'_{k+1} = I\sin\left(\theta + \Delta\theta - \dfrac{2k}{2k+1}\pi\right) \\ \vdots \\ i'_{2k+1} = I\sin\left(\theta + \Delta\theta + \dfrac{2}{2k+1}\pi\right) \end{cases} \quad (15)$$

Equation (14) can be transformed into Equation (16), shown below.

$$\begin{cases} I\sin\theta = i_1 \\ I\cos\theta = \dfrac{-(i_2 + \ldots + i_{k+1}) + (i_{k+2} + \ldots + i_{2k+1})}{2\sum_{m=1}^{k}\sin\dfrac{2m}{2k+1}\pi} \end{cases} \quad (16)$$

Meanwhile, Equation (15) can be transformed into Equation (17), shown below.

$$\begin{cases} i'_2 + \ldots + i'_{2k+1} = -i'_1 \\ i'_2 - i'_3 = I\sin(\theta + \Delta\theta)\left\{\cos\left(\dfrac{2}{2k+1}\pi\right) - \cos\left(\dfrac{4}{2k+1}\pi\right)\right\} - I\cos(\theta + \Delta\theta)\left\{\sin\left(\dfrac{2}{2k+1}\pi\right) - \sin\left(\dfrac{4}{2k+1}\pi\right)\right\} \\ \vdots \\ i'_2 - i'_{k+1} = I\sin(\theta + \Delta\theta)\left\{\cos\left(\dfrac{2}{2k+1}\pi\right) - \cos\left(\dfrac{2k}{2k+1}\pi\right)\right\} - I\cos(\theta + \Delta\theta)\left\{\sin\left(\dfrac{2}{2k+1}\pi\right) - \sin\left(\dfrac{2k}{2k+1}\pi\right)\right\} \\ i'_2 - i'_{k+2} = I\sin(\theta + \Delta\theta)\left\{\cos\left(\dfrac{2}{2k+1}\pi\right) - \cos\left(\dfrac{2k}{2k+1}\pi\right)\right\} - I\cos(\theta + \Delta\theta)\left\{\sin\left(\dfrac{2}{2k+1}\pi\right) + \sin\left(\dfrac{2k}{2k+1}\pi\right)\right\} \\ \vdots \\ i'_2 - i'_{2k} = I\sin(\theta + \Delta\theta)\left\{\cos\left(\dfrac{2}{2k+1}\pi\right) - \cos\left(\dfrac{4}{2k+1}\pi\right)\right\} - I\cos(\theta + \Delta\theta)\left\{\sin\left(\dfrac{2}{2k+1}\pi\right) + \sin\left(\dfrac{4}{2k+1}\pi\right)\right\} \\ i'_2 - i'_{2k+1} = I\sin(\theta + \Delta\theta)\left\{\cos\left(\dfrac{2}{2k+1}\pi\right) - \cos\left(\dfrac{2}{2k+1}\pi\right)\right\} - I\cos(\theta + \Delta\theta)\left\{\sin\left(\dfrac{2}{2k+1}\pi\right) + \sin\left(\dfrac{2}{2k+1}\pi\right)\right\} = -2I\cos(\theta + \Delta\theta)\sin\left(\dfrac{2}{2k+1}\pi\right) \end{cases} \quad (17)$$

From Equations (16) and (17), I2' is given by Equation (18), shown below.

$$i'_2 = ki'_1\cos\left(\dfrac{2}{2k+1}\pi\right) - k\left\{\cos\Delta\theta\dfrac{-\sum_{m=1}^{k}i_{m+1} + \sum_{m=1}^{k}i_{k+m+1}}{2\sum_{m=1}^{k}\sin\dfrac{2m}{2k+1}\pi} - \sin\Delta\theta i_1\right\}\sin\left(\dfrac{2}{2k+1}\pi\right) \quad (18)$$

The detected currents in' of the other phases can be calculated similarly, and are given by Equation (19), shown below.

$$i'_n = k\left[i'_1\cos\left(\dfrac{2n-2}{2k+1}\pi\right) - \left\{\cos\Delta\theta\dfrac{-\sum_{m=1}^{k}i_{m+1} + \sum_{m=1}^{k}i_{k+m+1}}{2\sum_{m=1}^{k}\sin\dfrac{2m}{2k+1}\pi} - \sin\Delta\theta i_1\right\}\sin\left(\dfrac{2n-2}{2k+1}\pi\right)\right] \quad (19)$$

$(n = 2, \ldots, 2k+1)$

In other words, the currents of the (x−1) undetectable phases can be estimated using Equation (20), shown below.

$$I_n = k\left[I_1\cos\left(\dfrac{2n-2}{2k+1}\pi\right) - \left\{\cos\Delta\theta\dfrac{-\sum_{m=1}^{k}I_{(m+1)\_old} + \sum_{m=1}^{k}I_{(k+m+1)\_old}}{2\sum_{m=1}^{k}\sin\dfrac{2m}{2k+1}\pi} - \sin\Delta\theta I_{1\_old}\right\}\sin\left(\dfrac{2n-2}{2k+1}\pi\right)\right] \quad (20)$$

$(n = 2, \ldots, 2k+1)$

Likewise in a case where x is an even number expressed by 2k+2, the currents of the (x−1) undetectable phases can be estimated in a similar manner using Equation (21), shown below.

$$\left\{ I_n = k \left[ I_1 \cos\left(\frac{2n-2}{2k+2}\pi\right) - \left\{ \cos\Delta\theta \frac{-\sum_{m=1}^{k} I_{(m+1)\_old} + \sum_{m=1}^{k} I_{(k+m+2)\_old}}{2\sum_{m=1}^{k} \sin\frac{2m}{2k+2}\pi} - \sin\Delta\theta I_{1\_old} \right\} \sin\left(\frac{2n-2}{2k+2}\pi\right) \right] \right. \tag{21}$$

$$I_{k+2} = -I_1 (n = 2, \ldots, k+1, k+3 \ldots, 2k+2)$$

Hence, according to the third embodiment, when the currents of (x−1) phases, among x phases, are undetectable in an AC rotary machine having x-phase windings (where x is a natural number no smaller than 3), the currents of the (x−1) undetectable phases can be calculated on the basis of the detected current of the single detectable phase obtained in the present, the x-phase detected currents obtained in the past, and the angle variation amount $\Delta\theta$ from the past to the present.

As a result, a superior effect not present in the prior art can be obtained, namely that a current detection error occurring when past detectable values of Ib_old, Ic_old are used as is as current values instead of estimating Ib and Ic by calculation using the detected current of the single detectable phase, and a torque ripple caused by the current detection error, can be greatly reduced, enabling a reduction in a region where open loop control is performed.

Note that in the estimation formula of the third embodiment, SIN $\Delta\theta$ and COS $\Delta\theta$ are used as is. Needless to mention, however, similar effects can be obtained by employing a Taylor-expanded polynomial of $\Delta\theta$ as the estimation formula, as described in the first and second embodiments.

The invention claimed is:

1. A control device for an AC rotary machine, comprising:
   an AC rotary machine having x-phase windings where x is at least three;
   an angle detector for detecting an angle of the AC rotary machine;
   a current detector for detecting currents of the respective phases of the x-phase windings;
   a voltage command calculator that calculates x-phase voltage commands by implementing feedback control on the respective phases so that respective deviations between a current command and the currents detected by the current detector are reduced to zero; and
   a power converter that applies a voltage to the x-phase windings on the basis of the x-phase voltage commands,
   wherein, when a current of at least one phase of the x phases is detectable and currents of at most (x−1) phases are undetectable at a present current detection timing, the current detector estimates the currents of the (x−1) phases that are undetectable at the present current detection timing by calculation on the basis of detected currents of x phases obtained at a past current detection timing, the detected current of the single phase that is detectable at the present current detection timing, and an angle variation amount, which is a difference between the angle of the AC rotary machine detected by the angle detector at the past current detection timing and the angle of the AC rotary machine at the present current detection timing, wherein
   when: the x-phase windings of the AC rotary machine are constituted by an odd number of windings; x=2k+1, where k is a natural number; a current of a phase corresponding to x=1 is delectable while currents of respective phases corresponding to at most x=2 to 2k+1 are undetectable at the present current detection timing,
   the current detector estimates the currents of the (x−1) phases that are undetectable at the present current detection timing by adding
      a value of multiplying, a current of the x=1 phase obtained at the present current detection timing, by a gain,
      a value of multiplying, a remainder of the sum of currents of x=2 to k+1 phases obtained at the past current detection timing and the sum of currents of x=k+2 to 2k+1 phases obtained at the past current detection timing, by a gain, and
      a value, of multiplying, a current of the x=1 phase obtained at the past current detection timing, by a gain.

2. The control device for the AC rotary machine according to claim 1, wherein, in a case where all of the x phases are detectable by the current detector, the detected currents of x phases obtained at the past current detection timing are constituted by the respective current values detected by the current detector, and
   in a case where only one phase of the x phases is undetectable by the current detector, the detected currents of x phases obtained at the past current detection timing are constituted by current values of (x−1) phases, detected by the current detector, and a current value obtained by determining the current of the remaining undetectable phase through calculation using the fact that a sum of the currents of all of the x phases is zero.

3. The control device for the AC rotary machine according to claim 1, wherein, n affix old denotes the past current detection timing; and $\Delta\theta$ corresponds to the angle variation amount, the current detector estimates, through calculation, the currents of the (x−1) phases that are undetectable at the present current detection timing using a following estimation formula $$I_n = k \left[ I_1 \cos\left(\frac{2n-2}{2k+1}\pi\right) - \right.$$

-continued $$\left\{\cos\Delta\theta \frac{-\sum_{m=1}^{k} I_{(m+1)\_old} + \sum_{m=1}^{k} I_{(k+m+1)\_old}}{2\sum_{m=1}^{k} \sin\frac{2m}{2k+1}\pi} - \sin\Delta\theta I_{1\_old}\right\}$$

$$\sin\left(\frac{2n-2}{2k+1}\pi\right)\Bigg]$$

$(n = 2, \ldots, 2k+1)$.

4. The control device for the AC rotary machine according to claim 1, wherein the current detector performs the estimation calculation by approximating COS $\Delta\theta$ by 1 and approximating SIN $\Delta\theta$ by $\Delta\theta$ in the estimation formula.

5. The control device for the AC rotary machine according to claim 1, wherein the current detector performs the estimation calculation by approximating COS $\Delta\theta$ by $1-\Delta\theta^2/2$ and approximating SIN $\Delta\theta$ by $\Delta\theta$ in the estimation formula.

6. The control device for the AC rotary machine according to claim 1, wherein the current detector performs the estimation calculation by approximating COS $\Delta\theta$ by $1-\Delta\theta^2/2$ and approximating SIN $\Delta\theta$ by $\Delta\theta-\Delta\theta^3/6$ in the estimation formula.

7. The control device for the AC rotary machine according to claim 1, wherein, when: the x-phase windings of the AC rotary machine are constituted by three phases, namely a u phase, a v phase, and a w phase; the three phases are generalized to an a phase, a b phase, and a c phase, where (a, b, c)=(u, v, w) or (a, b, c)=(v, w, u) or (a, b, c)=(w, u, v); a current of the a phase is detectable while currents of the b phase and the c phase are undetectable at the present current detection timing; an affix old denotes the past current detection timing; and $\Delta\theta$ corresponds to the angle variation amount, the current detector estimates, through calculation, the currents of the b phase and the c phase that are undetectable at the present current detection timing using a following estimation formula.

$$\begin{cases} I_b = \dfrac{-I_a + \sqrt{3}\,\Delta\theta I_{a\_old} + I_{b\_old} - I_{c\_old}}{2} \\ I_c = \dfrac{-I_a - \sqrt{3}\,\Delta\theta I_{a\_old} - I_{b\_old} - I_{c\_old}}{2} \end{cases}.$$

8. The control device for the AC rotary machine according to claim 1, wherein, when: the x-phase windings of the AC rotary machine are constituted by three phases, namely a u phase, a v phase, and a w phase; the three phases are generalized to an a phase, a b phase, and a c phase, where (a, b, c)=(u, v, w) or (a, b, c)=(v, w, u) or (a, b, c)=(w, u, v); a current of the a phase is detectable while currents of the b phase and the c phase are undetectable at the present current detection timing; an affix old denotes the past current detection timing; and $\Delta\theta$ corresponds to the angle variation amount, the current detector estimates, through calculation, the currents of the b phase and the c phase that are undetectable at the present current detection timing using a following estimation formula.

$$\begin{cases} I_b = \dfrac{-I_a + \sqrt{3}\,\Delta\theta I_{a\_old} + \left(1 - \dfrac{\Delta\theta^2}{2}\right)(I_{b\_old} - I_{c\_old})}{2} \\ I_c = \dfrac{-I_a - \sqrt{3}\,\Delta\theta I_{a\_old} - \left(1 - \dfrac{\Delta\theta^2}{2}\right)(I_{b\_old} - I_{c\_old})}{2} \end{cases}.$$

9. A control device for an electric power steering, comprising the control device for the AC rotary machine according to claim 1, wherein the voltage command calculator calculates the x-phase voltage commands such that the AC rotary machine generates torque for assisting steering torque generated by a steering system.

10. A control device for an AC rotary machine, comprising:

an AC rotary machine having x-phase windings where x is at least three;

an angle detector for detecting an angle of the AC rotary machine;

a current detector for detecting currents of the respective phases of the x-phase windings;

a voltage command calculator that calculates x-phase voltage commands by implementing feedback control on the respective phases so that respective deviations between a current command and the currents detected by the current detector are reduced to zero; and a power converter that applies a voltage to the x-phase windings on the basis of the x-phase voltage commands, wherein, when a current of at least one phase of the x phases is detectable and currents of at most (x−1) phases are undetectable at a present current detection timing, the current detector estimates the currents of the (x−1) phases that are undetectable at the present current detection timing by calculation on the basis of detected currents of x phases obtained at a past current detection timing, the detected current of the single phase that is detectable at the present current detection timing, and an angle variation amount, which is a difference between the angle of the AC rotary machine detected by the angle detector at the past current detection timing and the angle of the AC rotary machine at the present current detection timing, wherein when: the x-phase windings of the AC rotary machine are constituted by an even number of windings; x=2k+2, where k is a natural number; a current of a phase corresponding to x=1 is detectable while currents of respective phases corresponding to at most x=2 to 2k+2 are undetectable at the present current detection timing, the current detector estimates the currents of the (x−1) phases that are undetectable at the present current detection timing by adding a value of multiplying, a current of the x=1 phase obtained at the present current detection timing, by a gain, a value of multiplying, a remainder of the sum of currents of x=2 to k+1 phases obtained at the past current detection timing and the sum of currents of x=k+3 to 2k+2 phases obtained at the past current detection timing, by a gain, and a value of multiplying, a current of the x=1 phase obtained at the past current detection timing, by a gain.

11. The control device for the AC rotary machine according to claim 10, wherein, in a case where all of the x phases are detectable by the current detector, the detected currents of x phases obtained at the past current detection timing are constituted by the respective current values detected by the current detector, and in a case where only one phase of the x phases is undetectable by the current detector, the detected currents of x phases obtained at the past current detection timing are constituted by current values of (x−1) phases, detected by the current detector, and a current value obtained by determining the current of the remaining undetectable phase through calculation using the fact that a sum of the currents of all of the x phases is zero.

12. The control device for the AC rotary machine according to claim 10, wherein an affix old denotes the past current detection timing; and $\Delta\theta$ corresponds to the angle variation amount, the current detector estimates, through calculation, the currents of the (x−1) phases that are undetectable at the present current detection timing using a following estimation formula.

$$\begin{cases} I_n = k\left[I_1\cos\left(\frac{2n-2}{2k+2}\pi\right) - \left\{\cos\Delta\theta\frac{-\sum_{m=1}^{k}I_{(m+1)\_old} + \sum_{m=1}^{k}i_{(k+m+2)\_old}}{2\sum_{m=1}^{k}\sin\frac{2m}{2k+2}\pi} - \sin\Delta\theta I_{1\_old}\right\}\sin\left(\frac{2n-2}{2k+2}\pi\right)\right] \\ I_{k+2} = -I_1 \, (n = 2, \ldots, k+1, k+3 \ldots, 2k+2) \end{cases}.$$

* * * * *